(12) United States Patent
Nightingale et al.

(10) Patent No.: US 8,485,776 B2
(45) Date of Patent: Jul. 16, 2013

(54) WIND ENERGY SYSTEM

(75) Inventors: Christopher George Edward Nightingale, Singapore (SG); Teck Wee Ang, Singapore (SG); Boon Hou Tay, Singapore (SG); Swee Ming Goh, Singapore (SG); Jun Li, Singapore (SG)

(73) Assignee: Dragon Energy Pte. Ltd., Singapore (SG)

( * ) Notice: Subject to any disclaimer, the term of this patent is extended or adjusted under 35 U.S.C. 154(b) by 919 days.

(21) Appl. No.: 12/508,439

(22) Filed: Jul. 23, 2009

(65) Prior Publication Data

US 2010/0068030 A1    Mar. 18, 2010

(30) Foreign Application Priority Data

Sep. 12, 2008   (SG) .............................. 200806820-7

(51) Int. Cl.
*F03D 1/04*   (2006.01)
(52) U.S. Cl.
USPC ........................................................ 415/4.1
(58) Field of Classification Search
USPC .................. 416/198 R, 175, 146 R; 415/909, 415/4.1, 121.3, 2.1, 3.1, 4.2, 4.3, 4.4, 4.5, 415/905, 906, 907, 908
See application file for complete search history.

(56) References Cited

U.S. PATENT DOCUMENTS

| | | | | |
|---|---|---|---|---|
| 2,563,279 | A | * | 8/1951 | Rushing .......................... 415/4.3 |
| 3,473,038 | A | * | 10/1969 | Hakkarinen ..................... 290/44 |
| 4,140,433 | A | | 2/1979 | Eckel |
| 6,126,385 | A | * | 10/2000 | Lamont .......................... 415/4.5 |
| 6,710,468 | B1 | | 3/2004 | Marrero O'Shanahan |
| 8,120,193 | B2 | | 2/2012 | Nightingale |
| 2005/0074324 | A1 | * | 4/2005 | Yoo ................. 415/4.3 |
| 2006/0140748 | A1 | * | 6/2006 | Raziel .............................. 415/4.1 |
| 2008/0315592 | A1 | * | 12/2008 | Branco ........................... 290/55 |
| 2009/0096218 | A1 | | 4/2009 | Nightingale |

FOREIGN PATENT DOCUMENTS

| | | |
|---|---|---|
| DE | 3124892 | 1/1983 |
| DE | 20100512 | 5/2001 |
| EP | 1 233 178 | 8/2002 |
| EP | 2060784 | 5/2009 |
| GB | 2428258 A * | 1/2007 |
| GB | 2 430 982 | 4/2007 |
| GB | 2440264 A * | 1/2008 |
| SG | 152071 | 10/2007 |
| WO | WO 2008/009920 | 1/2008 |
| WO | WO PCT/SG09/000333 | 3/2011 |

OTHER PUBLICATIONS

PCT/SG09/000333 Search Report, May 14, 2010, Dragon Energy PTE. LTD.
PCT/SG09/000333 Written Opinion, May 14, 2010, Dragon Energy PTE. LTD.

(Continued)

*Primary Examiner* — Richard Edgar
(74) *Attorney, Agent, or Firm* — Wells St. John P.S.

(57) ABSTRACT

A wind energy system 10 comprises a wind tunnel module 12 having openings 14a and 14b at opposite ends. The openings have substantially the same cross-sectional area although the cross-sectional area of the wind tunnel module 12 decreases from the openings 14a and 14b in a direction toward an intermediate portion 16 of the tunnel module. The intermediate portion 16 has a substantially constant cross-sectional area. One or more wind turbines with equal or different number of blades may be mounted in the wind tunnel in or adjacent to the intermediate portion 16. The intermediate portion 16 is bendable to enable the module 12 to conform to a roof 20 of any pitch.

23 Claims, 6 Drawing Sheets

OTHER PUBLICATIONS

SG 200806820-7 Search Report, Feb. 25, 2010, Dragon Energy PTE. LTD.

SG 200806820-7 Written Opinion, Feb. 25, 2010, Dragon Energy PTE. LTD.

* cited by examiner

WIND ENERGY SYSTEM

CROSS REFERENCE TO RELATED APPLICATION

This application relates to and claims priority to corresponding Singapore Patent Application No. 200806820-7, which was filed on 12 Sep. 2008, and which is incorporated by reference herein.

FIELD OF THE INVENTION

The present invention relates to a wind energy system, particularly, though not exclusively, for building.

BACKGROUND OF THE INVENTION

Wind turbines are currently available for mounting on the roof of a building to drive a generator for generating electricity to at least partially meet the electrical power needs of the building. Applicant has previously devised an energy conversion system for a building comprising one or more wind turbines that are disposed along a ridge of a pitched roof. The system also comprises a cover supported by the pitched roof where the cover has a pitch less than the pitch of the pitched roof. The cover and the roof structure together create a wind tunnel that directs wind to flow through the wind turbines.

Further details of Applicant's abovementioned system are provided in Singapore patent application No. 200716868-5.

The present invention is a result of further research and development in the area of wind energy systems.

SUMMARY OF THE INVENTION

According to one aspect of the present invention there is provided a wind energy system comprising:
- a wind tunnel module having first and second openings at opposite ends, and an intermediate portion located between the first and second openings, each opening having substantially the same cross sectional area, the wind tunnel module reducing in cross sectional area from each opening in a direction toward the intermediate portion, wherein the intermediate portion has a substantially constant cross sectional area;
- one or more wind turbines supported in or adjacent the intermediate portion; and
- at least one electric generator driven by at least one of the wind turbines.

Each opening may be configured to receive wind incident at an angle of up to 60 degrees from either side thereof.

The intermediate portion may be in the form of a flexible or otherwise bendable tube.

The wind tunnel module may further comprise first and second tunnel portions, one at each end of the intermediate portion, the first tunnel portion having a mouth defining the first opening and the second tunnel portion having a mouth defining the second opening.

The wind tunnel module may further comprise a first turbine housing located adjacent one end of the intermediate portion and a second turbine housing located adjacent an opposite end of the intermediate portion.

The wind energy system may comprise two wind turbines.

An electric generator may be provided for each wind turbine.

In an alternate embodiment, a single generator may be provided which is driven by both of the wind turbines. This embodiment may be particularly useful in a high and strong wind environment, but is not limited to such an environment. At least one of the generators may be mounted in a hub of a turbine. It is envisaged in embodiments where the wind energy system comprises two turbines, that the wind turbines may have the same or different wind flow characteristics. In particular, in some embodiments, the turbines may be provided with different numbers of blades.

In one embodiment, one or more of the wind turbines is provided with a plurality of radially extending blades and an outer circumferential surface surrounding an outer radial edge of the blades. One or more of the wind turbines may further comprise an intermediate circumferential surface intersecting the turbine blades at a radial location intermediate of an axis of rotation of the turbine and the outer circumferential surface.

The wind energy system may further comprise a covering overlying the wind tunnel module. The covering may comprise first and second portions that are adjustably coupled together to enable adjustment of an angle between the portions along a line perpendicular to a direction of extent of the intermediate portion.

A further aspect of the present invention provides a wind energy conversion system for a building comprising: a plurality of wind energy systems in accordance with the first aspect of the present invention wherein the wind energy systems are arranged side by side and, a waterproof covering overlying the plurality of wind energy systems, the covering having opposite longitudinal edges that extend to at least cover the intermediate portion of each wind energy system. The cover may comprise first and second portions adjustably coupled together to enable adjustment of an angle between the portions along a line perpendicular to a direction of extent of the intermediate portions.

A further aspect of the present invention provides a wind tunnel module comprising first and second openings at opposite ends, and an intermediate portion located between the first and second openings, each opening having substantially the same cross sectional area, the wind tunnel module reducing in cross sectional area from each opening in a direction toward the intermediate portion of the wind tunnel module, wherein the intermediate portion has a substantially constant cross sectional area.

Yet a further embodiment of the invention provides a wind energy system comprising: a wind tunnel having open opposite ends to allow wind to pass in either direction through the tunnel; two wind turbines, one located at or near each end; and, an electric generator driven by the wind turbines. In this embodiment the wind turbines may be configured to provide a collective Betz limit of up to 0.83.

BRIEF DESCRIPTION OF THE DRAWINGS

Embodiments of the present invention will now be described by way of example only with reference to the accompanying drawings in which.

DETAILED DESCRIPTION OF PREFERRED EMBODIMENT

Figure 1:
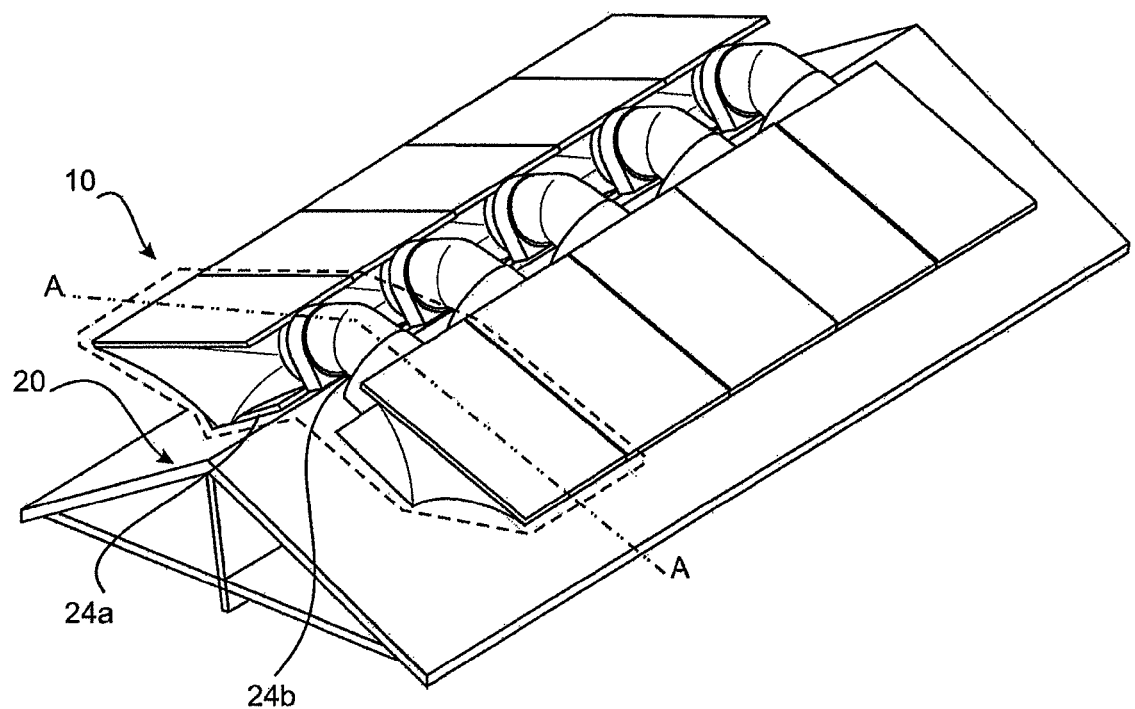
FIG. 1 is a schematic perspective view of one embodiment of a wind energy system applied to a roof of a building.

Referring to the accompanying drawings and in particular FIGS. 1 and 2 an embodiment of a wind energy system 10 according to the present invention comprises a wind tunnel module 12 having openings 14a and 14b (hereinafter referred to in general as "openings 14") at opposite ends. The openings 14 have substantially the same cross sectional area although the cross sectional area of the wind tunnel module 12 decreases from the openings 14 in a direction toward an intermediate portion 16 of the tunnel module 12. The intermediate portion 16 has a substantially constant cross sectional area. The system 10 may comprise one or more wind turbines 18a, 18b or 18c (hereinafter referred to in general as "turbines 18") as exemplified in FIGS. 3-5 respectively. The turbines 18 are mounted in the system 10 in or adjacent the intermediate portion 16. At least one electric generator (not shown) is also provided which is driven by at least one of the wind turbines 18.

In the embodiment depicted, the system 10 is one of a plurality of identical adjacent systems 10 mounted side by side on a pitched roof 20 with the intermediate portion 16 spanning a ridge 22 of the roof 20.

Turbine housings 24a and 24b (hereinafter referred to in general as "housings 24") are located at respective opposite ends of the intermediate portion 16. The housings 24 have an inner diameter which is similar to that of the intermediate portion 16. The housings 24 also act as a coupling between the intermediate portion 16 and respective tunnel portions 26a and 26b of the wind tunnel module 12.

Figure 6:
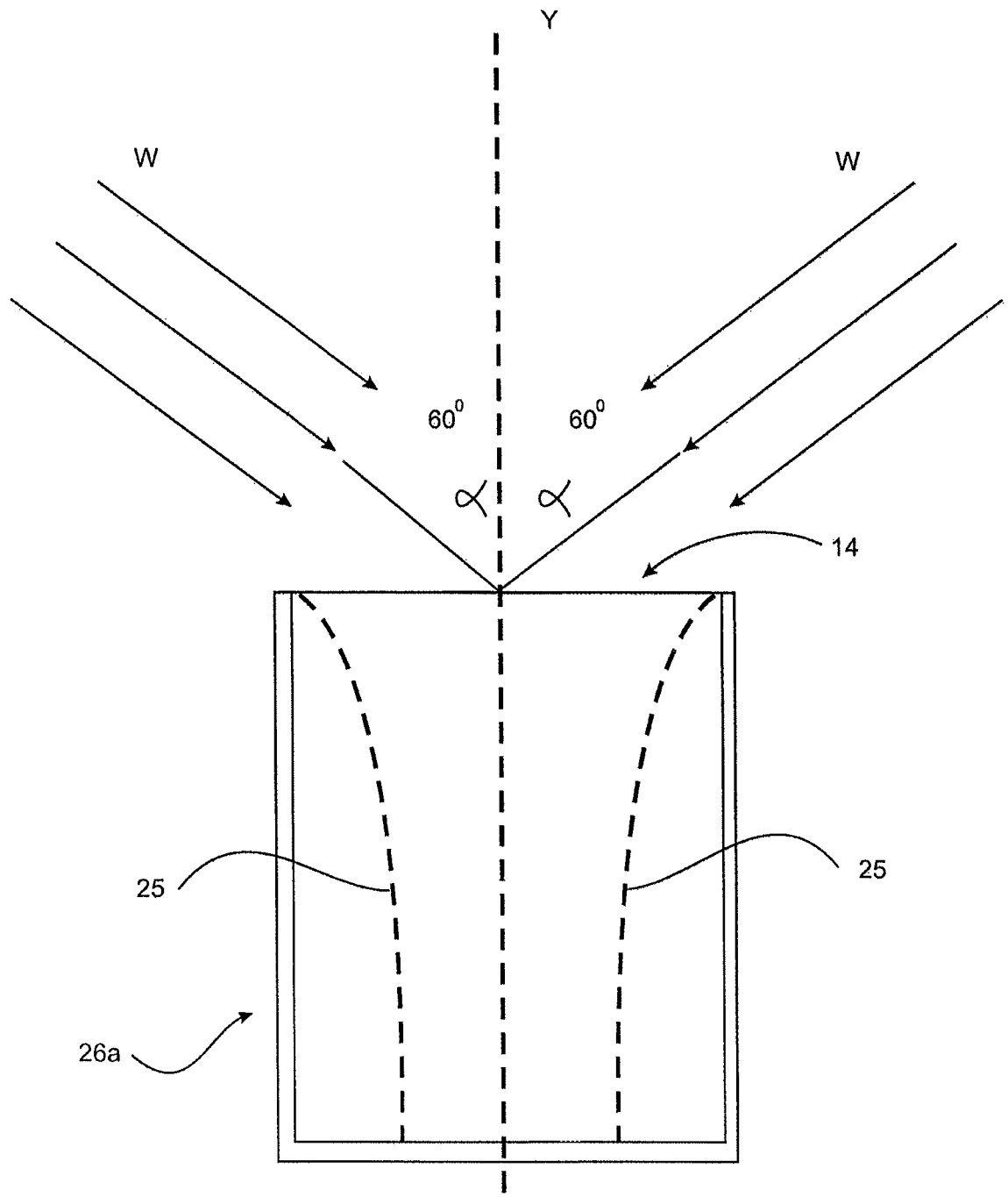

With reference to FIG. 6, each opening 14 is configured to enable the wind tunnel module 12 to receive wind incident at an angle a of up to 60 degrees from either side of the opening (which is equivalent to an angle a with a longitudinal axis Y of the opening 14 and tunnel 26). FIG. 6 also illustrates one possible shape and configuration of side walls 25 of the tunnel portion 26 which provide the decrease in cross sectional area of the wind tunnel module 12 from the opening 14 in a direction toward an intermediate portion 16 of the tunnel module 12.

When the system 10 comprises two wind turbines 18, each turbine is mounted in a respective housing 24. Wind W entering one of the openings 14 flows through the adjacent tunnel portion 26 the intermediate portion 16, the other tunnel portion 26 and exits from the opposite opening 14. As the cross sectional area of the wind tunnel module 12 (and specifically the tunnel portions 26) decreases in a direction from the opening 14 toward the intermediate portion 16, there is an accompanying increase in wind velocity. It is known that the power output from a wind turbine is proportional to the cube of wind velocity. Therefore increasing wind velocity will improve power output.

It is also known that the kinetic energy of the wind cannot be harnessed with 100% efficiency. Specifically, Betz law establishes that the maximum conversion of kinetic energy to mechanical energy using a wind turbine is about 59%. The more kinetic energy a wind turbine extracts from the wind, the more the wind is slowed as it passes through the wind turbine. For a wind turbine to be 100% efficient the wind speed would need to drop to zero as it leaves the turbine. However, if this speed were to drop to zero then no air would leave the turbine and thus no energy would be extracted because no wind could enter the turbine.

Figure 3:
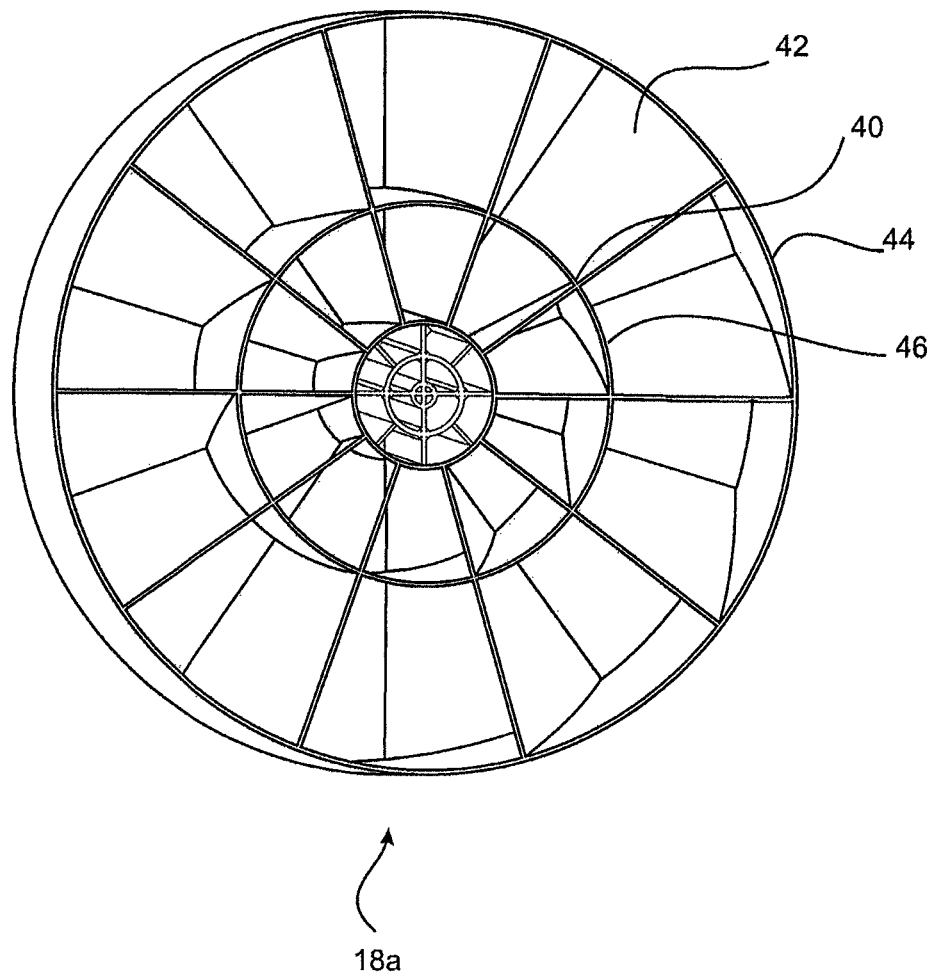
FIG. 3 is a front elevation view of one embodiment of a wind turbine that may be incorporated into a wind energy system.
Figure 4:
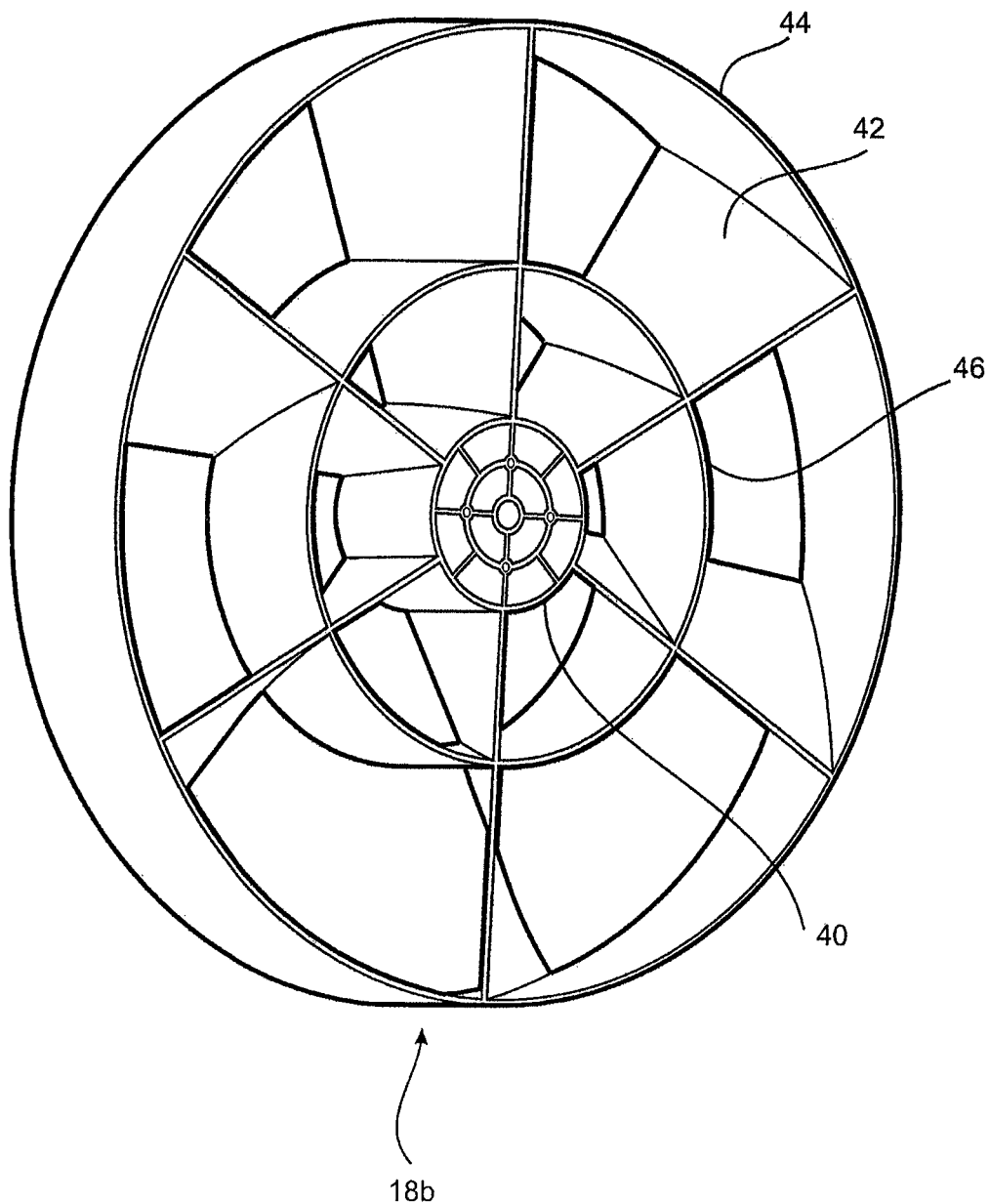
FIG. 4 is a representation of a further wind turbine that may be incorporated in a wind energy system.

Some embodiments of the system 10 attempt to provide a composite system where total energy efficiency may be greater than the Betz limit for a single turbine. In one embodiment of the system 10 which may be particularly well suited to high or strong wind environments, where, say, the wind predominantly enters the wind tunnel module 12 from the opening 14a, a ten blade turbine 18a as shown in FIG. 3 may be installed in the housing 24a and a six blade turbine 18b as depicted in FIG. 4 may be installed in the housing 24b. In this configuration wind energy is harnessed by the ten blade turbine 18a initially and subsequently harnessed by the six blade turbine 18b. Each of the turbines 18 is connected to a generator or alternate via a gear box (not shown) for converting the wind energy into electrical energy.

When the wind W first enters the tunnel module 12 from the opening 14a and the raw wind power is 100% of the power for harvesting.

The percentage of wind power harvested at the first turbine is,

Percentage of Wind Power Harvested at the 1st Turbine=$\eta_{turb}$ where $\eta_{turbine}$ is the efficiency of the turbine.

Disregarding the power losses due to friction in the wind tube, the wind power which passed through the first turbine reaches the second turbine is, Percentage of Wind Power arriving at the 2nd Turbine=$1-\eta_{turb}$ The second turbine also has the efficiency of $\eta_{turbine}$. The compounded efficiency of the dual turbine module is, $$\eta_{dualturb} = \eta_{turb} + \eta_{turb}(1 - \eta_{turb})$$
$$= \eta_{turb}[1 + (1 - \eta_{turb})]$$
$$= \eta_{turb}[2 - \eta_{turb}]$$
$$\eta_{dualturb} = 2\eta_{turb} - \eta_{turb}^2$$

Ideal efficiency of the Dual Turbine System would be at Betz Limit. (i.e. having ideal turbines at 59% efficiency)

Ideal $\eta_{dual\ turb} = 2\eta_{Betz} - \eta^2_{Betz}$

As illustrated above, the use of two turbines in a single module for project sites with strong wind can increase the Betz Limit from 0.59 to 0.83 collectively.

Figure 5:
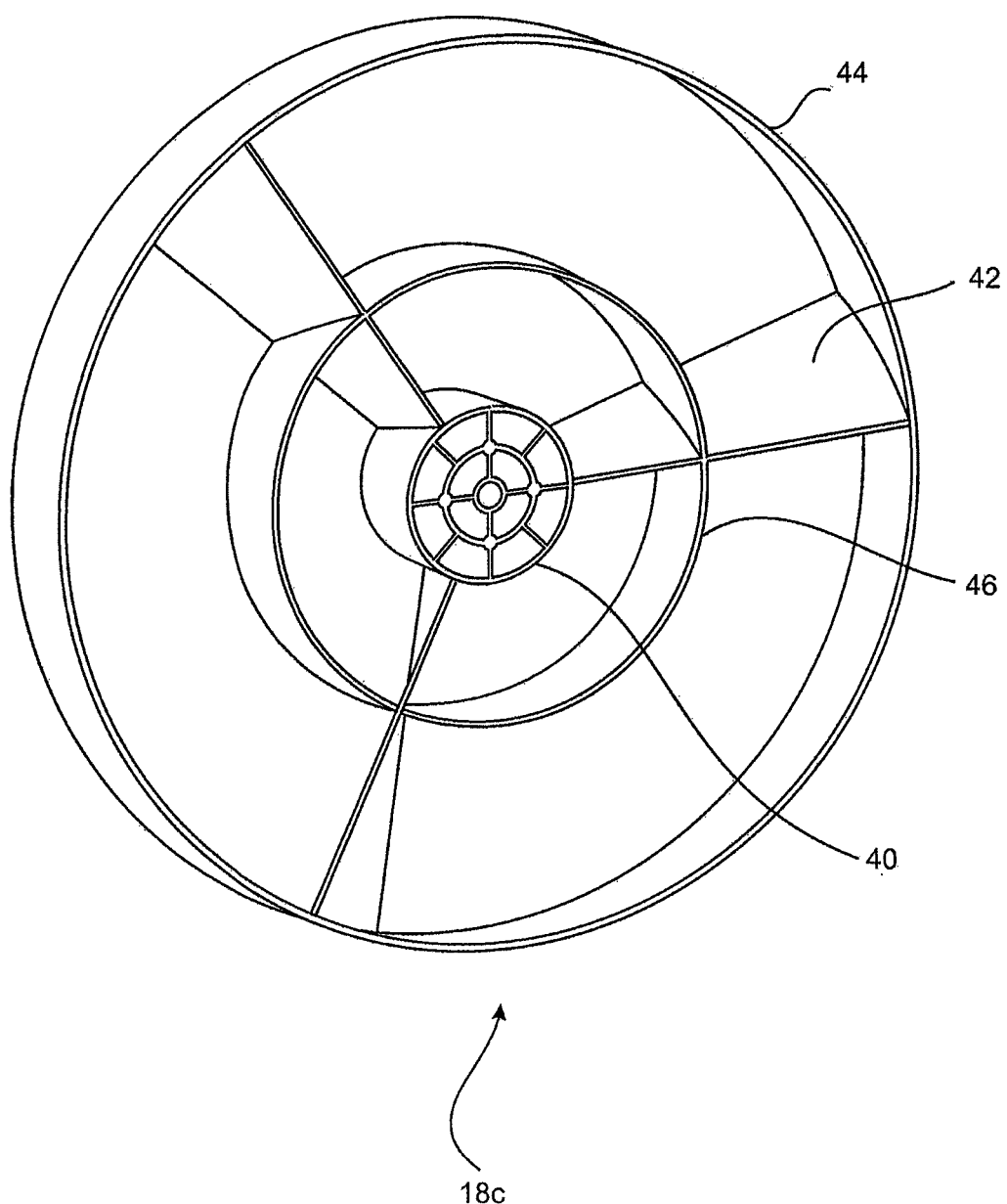
FIG. 5 is a representation of another wind energy turbine that may be incorporated in the system; and, FIG. 6 is a schematic plan view of wind coverage at a broad end of a wind tunnel incorporated in the wind energy system.

In a medium wind environment, and with the wind W predominantly entering the tunnel module 12 from the opening 14a, a ten blade turbine 18a as depicted in FIG. 3 may be installed in the housing 24a, while a three blade turbine 18c as depicted in FIG. 5 may be installed in the housing 24b. In this embodiment, a generator or alternator may be coupled to only the turbine 18a in the housing 24a, with the turbine 18c not connected to a generator. The three blade turbine 18c acts as a wind pressure compensating turbine that stabilises back pressure in the tunnel module 12 for the turbine 18a to smooth air flow. In addition, the turbine 18c may act as a suction pump to draw more air through the opening 14a. This action of the turbine 18c may be better understood by considering strong and weak wind situations. In a strong wind the turbine 18c will rotate at speed from the air passing through the upstream turbine 18a. When the wind strength decreases its speed decays slowing due to the principle of conservation of momentum and thus the turbine acts to draw more air into the tunnel from the end housing the turbine 18a.

In yet a further variation of the system 10, for low wind environments, the system 10 may be provided with only a single turbine being either a 10 or 6 blade turbine 18a, 18b as shown in FIGS. 3 and 4 installed in the housing 24a assuming the predominate direction of the wind W is such that it mostly enters the tunnel module 12 from the opening 14a. No turbine is installed in the housing 24b thereby removing air flow resistance through the tunnel module 12.

To facilitate easier installation of one or more systems 10 on a roof 20, the intermediate portion 16 may be made from a flexible material or from a bendable structure. This enables a system 10 to closely conform to the pitch high roof 20 with the system 10 bending at a location approximately midway of the length of the flexible portion 16 about the ridge 22. The tunnel portions 26 are typically made from rigid material such as plastics or metal.

A covering 30 may be placed over the module 10. The covering 30 may indeed act as additional roof covering providing a water proof barrier. The covering 30 has opposite longitudinal edges 32 which in the depicted embodiment extend marginally beyond an upper extremity of each opening 14 of the tunnel portions 26. However, in alternate embodiments, it is envisaged that the covering 30 be configured so that its edges 32 at a minimum extend to at least cover the intermediate portion 16.

The covering 30 comprises two portions or panels 34 that are adjustably coupled together for example by way of a hinge 36 so as to enable the adjustment of an angle between the portions 34.

Forming the covering 30 from two portions or panels 34 connected by a hinge 36 and the adoption of a flexible intermediate portion 16 offers collectively a safety feature under an extreme wind storm. In such extreme weather conditions, coupling between the intermediate portion 16 and respective tunnel portions 26a and 26b of the wind tunnel module 12 can be removed, allowing strong wind to escape vertically by lifting the respective portion or panel up.

Figure 2:
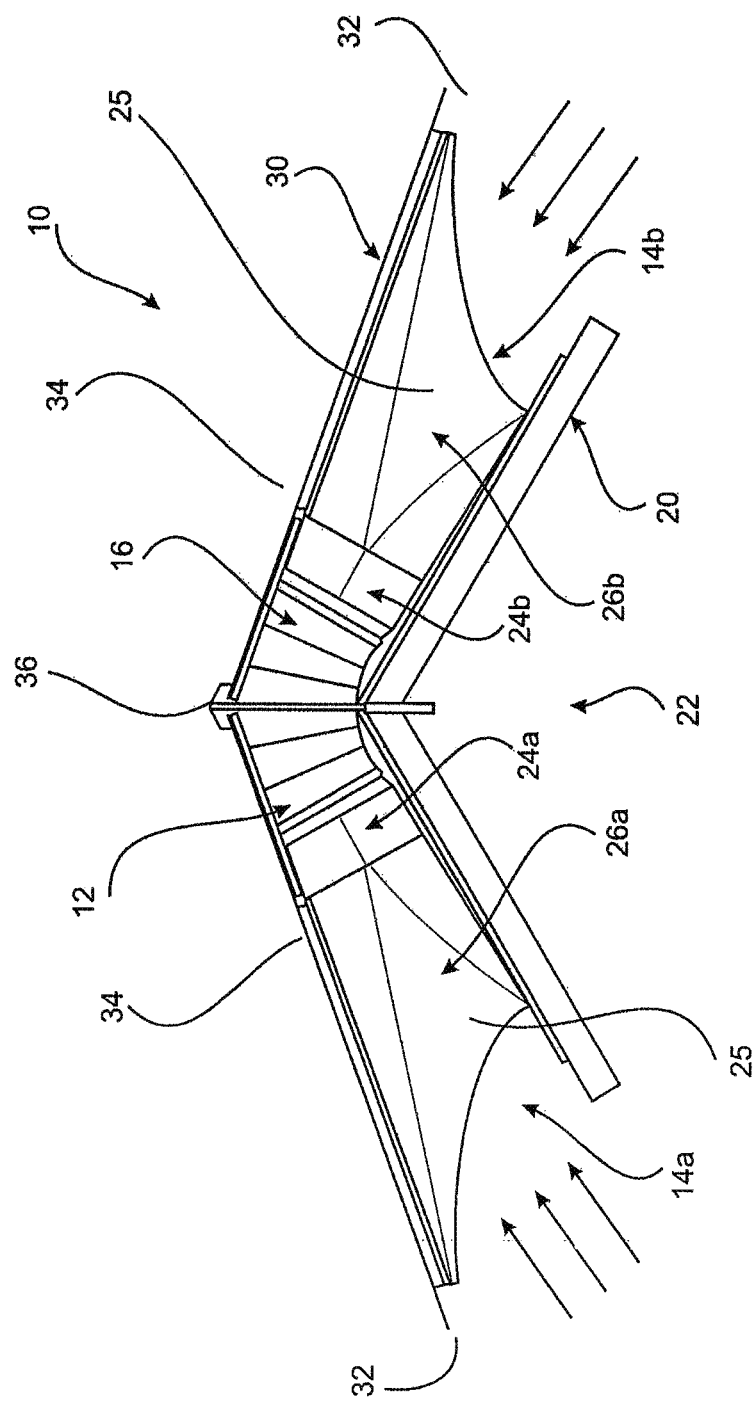
FIG. 2 is a view of section AA of the system depicted in FIG. 1.

When multiple systems 10 are provided on a roof 20 and disposed side by side as depicted in FIG. 1 the covering 30 may similarly be extended to cover the multiple modules 10.

Referring to FIGS. 3-5, the turbines 18 are depicted as comprising a central hub 40, the plurality of radially extending blades 42, an outer circumferential wall or ring 44, and an intermediate circumferential wall or ring 46. The outer ring 44 is connected with and surrounds or covers the radial outer edge of each blade 46. The intermediate ring 46 is spaced between the hub 40 (and thus an axis of rotation of the turbine) and the outer ring 44. Intermediate wall 46 connects with each of the blades 42.

As is readily apparent, the substantive difference between the turbines 18a, 18b and 18c resides in the number of blades 42. The difference in the number of blades provides each of the turbines 18 with different air flow characteristics and accordingly different wind to mechanical energy conversion efficiency. However, the different air flow characteristics and efficiency may also be achieved by varying the twist, or angle of attack of each blade 42.

Now that embodiments of the invention have been described in detail it will be apparent to those skilled in the relevant arts that numerous modifications and variations may be made without departing from the basic inventive concepts. For example, while embodiments that have been described comprising one or two turbines 18, it is envisaged that more than two turbines may be provided in various circumstances. For example, a third turbine may be provided at location substantially midway through the intermediate portion 16. Further, while the systems 10 are depicted as being mounted on a pitched roof, they may be mounted on a flat roof. Indeed it is also envisaged that the systems may be mounted on a vertical wall to take advantage of either up draft (in which case the wind tunnel modules 12 are generally vertically aligned); or "tunnel effect" where buildings may channel wind to flow across the vertical walls of the buildings, in which case the wind tunnel modules 12 are generally horizontally aligned.

All such modifications and variations together with others that would be obvious to a person of ordinary skill in the art are deemed to be within the scope of the present invention the nature of which is to be determined from the above description and the appended claims.

The invention claimed is:

1. A wind energy system comprising:
a wind tunnel module having first and second openings at opposite ends, and an intermediate portion located between the first and second openings, each opening having substantially the same cross sectional area, the wind tunnel module reducing in cross sectional area from each opening in a direction toward the intermediate portion, wherein the intermediate portion has a substantially constant cross sectional area;
one or more wind turbines supported in or adjacent the intermediate portion;
at least one electric generator driven by at least one of the wind turbines;
a covering overlying the wind tunnel module; and
wherein the covering comprises first and second portions that are adjustably coupled together to enable adjustment of an angle between the first and second portions along a line perpendicular to a direction of extent of the intermediate portion.

2. The wind energy system according to claim 1 wherein the intermediate portion is in the form of a flexible or otherwise bendable tube.

3. The wind energy system according to claim 1 further comprising first and second tunnel portions, one at each end of the intermediate portion, the first tunnel portion having a mouth defining the first opening and the second tunnel portion having a mouth defining the second opening.

4. The wind energy system according to claim 1 further comprising a first turbine housing located adjacent one end of the intermediate portion and a second turbine housing located adjacent an opposite end of the intermediate portion.

5. The wind energy system according to claim 1 comprising two wind turbines.

6. The wind energy system according to claim 5 wherein the wind turbines have the same wind flow characteristics.

7. The wind energy system according to claim 5 wherein the wind turbines have different wind flow characteristics.

8. The wind energy system according to claim 7 wherein the wind turbines have a different number of radially extending blades.

9. The wind energy system according to claim 1 wherein one or more of the wind turbines is provided with a plurality of radially extending blades and an outer circumferential surface surrounding an outer radial edge of the blades.

10. The wind energy system according to claim 9 wherein one or more of the wind turbines comprises an intermediate circumferential surface intersecting the turbine blades at a radial location intermediate of an axis of rotation of the turbine and the outer circumferential surface.

11. A wind energy system according to claim 1 wherein the openings are configured to receive wind at an angle of up to 60 degrees from either side thereof.

12. A wind energy conversion system for a building comprising:
a plurality of wind energy systems individually comprising:
a wind tunnel module having first and second openings at opposite ends, and an intermediate portion located between the first and second openings, each opening having substantially the same cross sectional area, the wind tunnel module reducing in cross sectional area from each opening in a direction toward the intermediate portion, wherein the intermediate portion has a substantially constant cross sectional area and is in the form of a flexible or otherwise bendable tube;
one or more wind turbines supported in or adjacent the intermediate portion; and
at least one electric generator driven by at least one of the wind turbines; and
wherein the wind energy systems are arranged side by side and, a waterproof covering overlying the plurality of wind energy systems, the covering having opposite longitudinal edges that extend to at least cover the intermediate portion of each wind energy system.

13. The wind energy conversion system of claim 12 wherein the cover comprises first and second portions adjustably coupled together to enable adjustment of an angle between the portions along a line perpendicular to a direction of extent of the intermediate portions.

14. A wind energy conversion system for a building comprising:
a plurality of wind energy systems individually comprising:
a wind tunnel module having first and second openings at opposite ends, and an intermediate portion located between the first and second openings, each opening having substantially the same cross sectional area, the wind tunnel module reducing in cross sectional area from each opening in a direction toward the intermediate portion, wherein the intermediate portion has a substantially constant cross sectional area;
one or more wind turbines supported in or adjacent the intermediate portion;
at least one electric generator driven by at least one of the wind turbines;
a first turbine housing located adjacent one end of the intermediate portion; and
a second turbine housing located adjacent an opposite end of the intermediate portion; and
wherein the wind energy systems are arranged side by side and, a waterproof covering overlying the plurality of wind energy systems, the covering having opposite longitudinal edges that extend to at least cover the intermediate portion of each wind energy system.

15. The wind energy conversion system of claim 14 wherein the cover comprises first and second portions adjustably coupled together to enable adjustment of an angle between the portions along a line perpendicular to a direction of extent of the intermediate portions.

16. A wind energy conversion system for a building comprising:
a plurality of wind energy systems individually comprising:
a wind tunnel module having first and second openings at opposite ends, and an intermediate portion located between the first and second openings, each opening having substantially the same cross sectional area, the wind tunnel module reducing in cross sectional area from each opening in a direction toward the intermediate portion, wherein the intermediate portion has a substantially constant cross sectional area;
two wind turbines supported in or adjacent the intermediate portion, wherein the wind turbines have different wind flow characteristics; and
at least one electric generator driven by at least one of the wind turbines; and
wherein the wind energy systems are arranged side by side and, a waterproof covering overlying the plurality of wind energy systems, the covering having opposite longitudinal edges that extend to at least cover the intermediate portion of each wind energy system.

17. The wind energy system according to claim 16 wherein the wind turbines have a different number of radially extending blades.

18. The wind energy conversion system of claim 16 wherein the cover comprises first and second portions adjustably coupled together to enable adjustment of an angle between the portions along a line perpendicular to a direction of extent of the intermediate portions.

19. A wind energy conversion system for a building comprising:
a plurality of wind energy systems individually comprising:
a wind tunnel module having first and second openings at opposite ends, and an intermediate portion located between the first and second openings, each opening having substantially the same cross sectional area, the wind tunnel module reducing in cross sectional area from each opening in a direction toward the intermediate portion, wherein the intermediate portion has a substantially constant cross sectional area;
one or more wind turbines supported in or adjacent the intermediate portion; and
at least one electric generator driven by at least one of the wind turbines;
wherein the wind energy systems are arranged side by side and, a waterproof covering overlying the plurality of wind energy systems, the covering having opposite longitudinal edges that extend to at least cover the intermediate portion of each wind energy system; and
wherein the cover comprises first and second portions adjustably coupled together to enable adjustment of an angle between the portions along a line perpendicular to a direction of extent of the intermediate portions.

20. The wind energy conversion system of claim 19 wherein an individual one of the wind energy systems further comprises first and second tunnel portions, one at each end of the intermediate portion, the first tunnel portion having a mouth defining the first opening and the second tunnel portion having a mouth defining the second opening.

21. The wind energy conversion system of claim 19 wherein an individual one of the wind energy systems comprises two wind turbines having the same wind flow characteristics.

22. The wind energy conversion system of claim 19 wherein an individual one of the wind energy systems comprises two wind turbines having different wind flow characteristics.

23. The wind energy conversion system of claim 19 wherein one or more of the wind turbines of an individual one of the wind energy systems is provided with a plurality of radially extending blades and an outer circumferential surface surrounding an outer radial edge of the blades.

* * * * *